(12) United States Patent
Fard

(10) Patent No.: US 8,749,574 B2
(45) Date of Patent: Jun. 10, 2014

(54) METHOD AND APPARATUS FOR IMPROVED COLOR MANAGEMENT

(75) Inventor: Assana Fard, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1215 days.

(21) Appl. No.: 12/242,468

(22) Filed: Sep. 30, 2008

(65) Prior Publication Data

US 2009/0303261 A1  Dec. 10, 2009

Related U.S. Application Data

(60) Provisional application No. 61/059,696, filed on Jun. 6, 2008.

(51) Int. Cl.
*G09G 5/02* (2006.01)
*G06K 9/00* (2006.01)
*G06F 15/00* (2006.01)

(52) U.S. Cl.
USPC ........... 345/593; 345/589; 345/590; 345/604; 382/162; 382/167; 358/1.9

(58) Field of Classification Search
None
See application file for complete search history.

(56) References Cited

U.S. PATENT DOCUMENTS

| | | | |
|---|---|---|---|
| 5,909,291 A * | 6/1999 | Myers et al. | 358/523 |
| 7,312,800 B1 * | 12/2007 | Gies et al. | 345/591 |
| 2006/0098233 A1 | 5/2006 | Jodra et al. | |
| 2006/0170940 A1 | 8/2006 | Kang et al. | |
| 2006/0274342 A1 * | 12/2006 | Haikin et al. | 358/1.9 |
| 2008/0024510 A1 * | 1/2008 | Lee et al. | 345/582 |
| 2008/0030520 A1 | 2/2008 | Dyke et al. | |
| 2008/0218780 A1 * | 9/2008 | Shimbaru | 358/1.9 |
| 2009/0189830 A1 * | 7/2009 | Deering et al. | 345/1.3 |

OTHER PUBLICATIONS

"ColorSync in Mac OS X", Technology Overview, Apple Computer, Inc., May 2003, 25 pages.
"Color Management Overview", Graphics & Imaging>ColorSync, Apple Inc., Jul. 7, 2005, 28 pages.

* cited by examiner

*Primary Examiner* — Tize Ma
(74) *Attorney, Agent, or Firm* — Blakely, Sokoloff, Taylor & Zafman LLP

(57) ABSTRACT

A method and apparatus for color matching during compositing. In one embodiment of the invention, a set of one or more un-color matched pixels are stored and associated with a first color profile. A fragment program is generated based on the first color profile and a second color profile associated with a display. During compositing of the set of un-color matched pixels, the fragment program is applied to the set of un-color matched pixels to match colors of those pixels with the display. The color matched pixels are written to the display. Other methods and apparatuses are also described.

26 Claims, 7 Drawing Sheets

METHOD AND APPARATUS FOR IMPROVED COLOR MANAGEMENT

CROSS-REFERENCE TO RELATED APPLICATIONS

This application claims the benefit of U.S. Provisional Application No. 61/059,696, filed Jun. 6, 2008, which is hereby incorporated by reference in its entirety.

BACKGROUND

1. Field

Embodiments of the invention relate to the field of computer graphics; and more specifically, to color management.

2. Background

Color management is used to provide consistent color across disparate sources. For example, a display can only display colors within its gamut (e.g., within its particular subset of the visible color space). Other devices (e.g., printer, scanner, camera (still and/or video), etc.) may have different gamuts. The color space associated with the source (e.g., an image) is approximately matched to the colors on the destination (e.g., a display).

Each device and/or image may be associated with one or more color profiles. A profile includes data that describes a particular color gamut. Commonly, color profiles conform to the International Color Consortium (ICC) standard (e.g., as exemplary described in International Color Consortium (ICC) Specification ICC.1:2004-10, 2004). The profile associated with the image (and which describes the color gamut associated with the image) is typically called the source profile. The profile associated with the destination of the image (e.g., an output device) is called the destination profile. For example, if the image is to be drawn on a display, color matching is performed using the display's profile (the destination profile) and the image's profile (the source profile) to match the colors of the image to the display gamut. An intermediate color space, known as a profile connection space (PCS) may be used during color management. For example, during color matching, the source color space is matched to the destination color space through the PCS.

It may be necessary to approximate a color in case the destination device does not support a particular color from the source image (e.g., that color is out of gamut of the destination device). Each profile may be tagged with a default rendering intent, which influences how the colors are approximated. The following rendering intents are commonly used: perceptual, saturation, relative colorimetric, and absolute colorimetric.

In the case of performing color matching of an image to a display, typically the color matching is performed on the image prior to the image being sent to the graphics card. After color matching, the color corrected image is stored and sent to the graphics card. For example, color matching is performed by the CPU and the color corrected image is stored in system memory (e.g., a backing store). The graphics card performs compositing and the image is drawn on the display.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
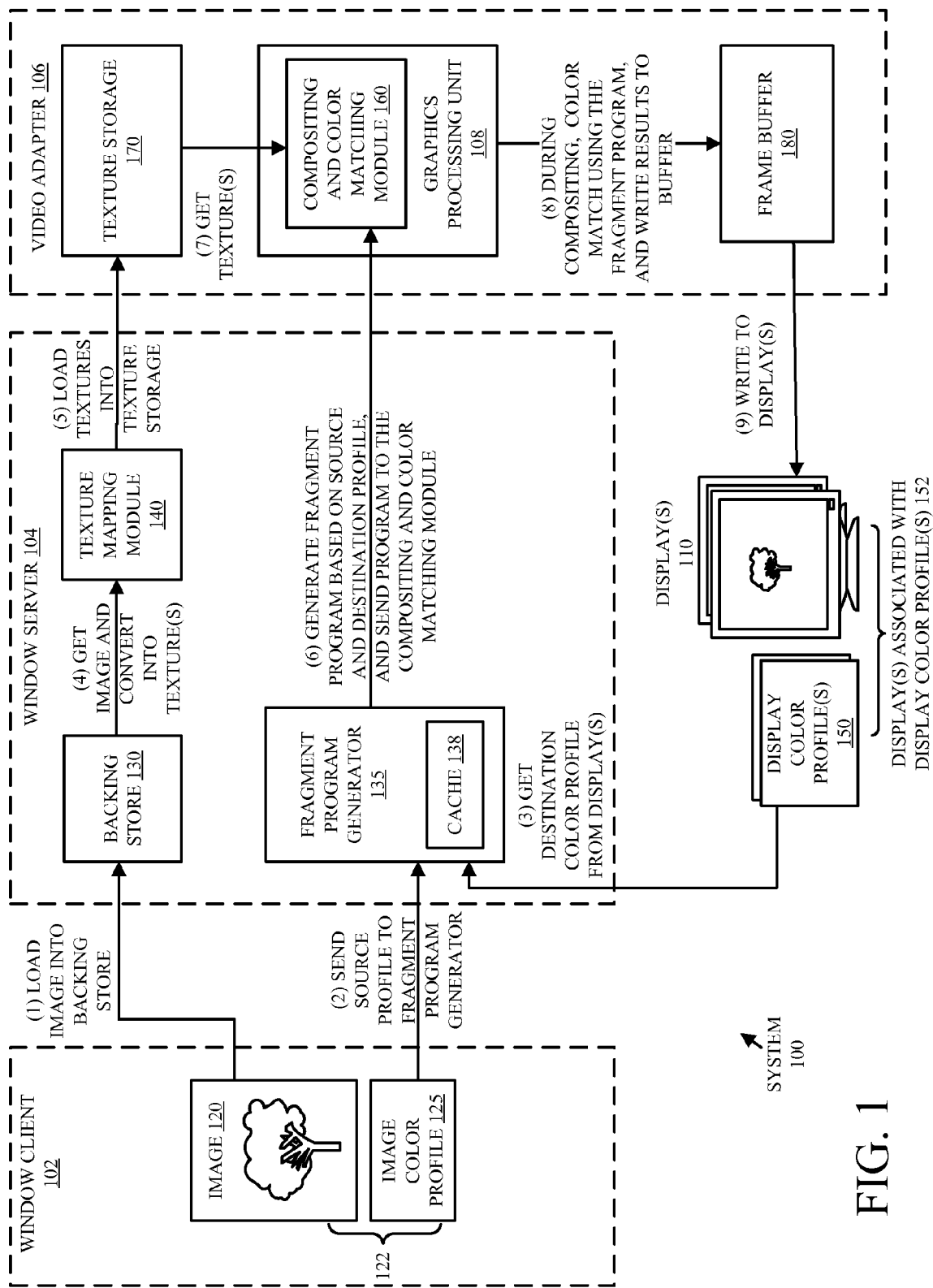
FIG. 1 is a data flow diagram illustrating color matching of an image during compositing according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a mobile device (e.g., laptop, palmtop, portable media player, smartphone, multimedia mobile phone, mobile gaming system, etc.), a non-mobile device (e.g., desktop computer, workstation, server, etc.). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a keypad, a touchscreen, and/or a display), and one or more network connections. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

A method and apparatus for color matching during compositing is described. In one embodiment of the invention, un-color matched pixels are received at a window server (e.g., pixels of an image) and stored in a backing store of the window server. In addition, the un-color matched pixels are associated with a first color profile. The window server generates a fragment program based on the first color profile and a second color profile associated with a display, and transmits the generated fragment program to a graphical processing unit. During compositing of the set of un-color matched pixels, the graphical processing unit applies the generated fragment program to the set of un-color matched pixels to match colors of those pixels with the display, and those color matched pixels are written to the display.

In another embodiment of the invention, a first region of a window is associated with a first color profile and a second region of the window is associated with a second color profile, where the first and second color profiles are different. The window server generates a first fragment program based on the first color profile and a third color profile associated with a display, and generates a second fragment program based on the second color profile and the third color profile. The window server transmits the first and second generated fragment programs to a graphical processing unit. During compositing of the set of pixels of the first and second region, the graphical processing unit applies the first and second generated fragment program to the set of pixels of the first and second region respectively to match colors of the pixels of the first and second region with the display. The color matched pixels are written to the display.

In another embodiment of the invention, a computing system includes at least two displays. The first display is associated with a first color profile and the second display is associated with a second color profile different than the first color profile. A window of the computing system is associated with a third color profile. Upon determining that a first portion of the window is to be positioned in an area of the first display and a second portion of the window is to be positioned in an area of the second display, the window server generates a first fragment program based on the first color profile and the third color profile and generates a second fragment program based on the second color profile and the third color profile. The window server transmits the first and second generated fragment programs to a graphical processing unit. During compositing of the first portion of a set of un-color matched pixels of the window, the graphical processing unit applies the first fragment program to match colors of those pixels of the first portion to the first display. During compositing of the second portion of the set of un-color matched pixels of the window, the graphical processing unit applies the second fragment program to match colors of those pixels of the first portion to the second display. The color matched pixels are written to the display.

FIG. 1 is a data flow diagram illustrating color matching of an image during compositing according to one embodiment of the invention. The operations of FIG. 1 will be described with reference to the exemplary embodiments of FIGS. 2-6. However, it should be understood that the operations of FIG. 1 can be performed by embodiments of the invention other than those discussed with reference to FIGS. 2-6, and the embodiments discussed with reference to FIGS. 2-6 can perform operations different than those discussed with reference to FIG. 1.

FIG. 1 includes the computing system 100. The computing system 100 may take on various forms in different embodiments of the invention including laptops, desktops, workstations, palmtops, smartphones, or other computing systems. The computer system 100 includes the window client 102, the window server 104, the video adapter 106, and one or more display(s) 110. Thus, in one embodiment of the invention, the computing system 100 is a multiple monitor system (e.g., dual monitors). It should be understood that the architecture of the computing system 100 illustrated in FIG. 1 is an example of an architecture of a computing system, and other, alternative architectures, may be used with the embodiments of the invention described herein. In addition, many well known features of the computing system 100 have not been illustrated in FIG. 1 in order not to obscure understanding of the invention.

The window client 102 is typically an application requesting, from the window server 104, for a window to be displayed on a display (e.g., display 110). For example, the application may be a word processing application, web browser application, photography application, or any other application that wishes to place data on the display. The window client 102 includes the image 120. An image is a set of one or more pixels. Images may take a variety of forms including bitmap, JPEG, Apple Icon Image, DNG, GIF, PDF, QuickTime Image, or other image file formats. According to one embodiment of the invention, an image may be associated with a color profile (e.g., a ICC color profile associated with a particular color space RGB (red, green, blue), Adobe RGB, HSV (hue, saturation, value), CMYK (cyan, magenta, yellow, key (black)), etc.). Color profiles may vary between "dull" profiles (e.g. profiles associated with a color space that has a relatively low amount of colors of the total visible color space) and "bright" profiles (e.g. profiles associated with a color space that has a relatively high amount of colors of the total visible color space). Additionally, color profiles may be user customizable. According to one embodiment of the invention, the color profile associated with the image may be assigned by the device or application that created the image (e.g., if the image was created by a digital camera, the digital camera may associate a color profile with the image). In another embodiment of the invention, the color profile associated with the image may be configured by application. In FIG. 1, the image 120 is associated with the image color profile 125, as indicated by the numeral 122.

The window server 104 is coupled with the window client 102. According to one embodiment of the invention, the window server 104 manages each pixel written to the display(s) 110. For example, in one embodiment of the invention, each application that wishes to write on a display does so through the window server 104. Examples of window servers include Quartz compositor, Desktop Window Manager, X Window Server, etc.). The window server 104 includes the backing store 130, the texture mapping module 140, and the fragment program generator 35, which includes the cache 138. According to one embodiment of the invention, the backing store 130 stores each pixel of the image 120. Typically, each window has its own backing store. As will be discussed in greater detail later herein, in one embodiment of the invention, the backing store 130 stores un-color corrected pixels. The window server 104 is also coupled with the video adapter 106. The video adapter 106 includes the texture storage 170, the graphics processing unit (GPU) 108 (which includes the compositing and color matching module 160), and the frame buffer 180. According to one embodiment of the invention, the texture storage 170 and the frame buffer 180 are stored in VRAM (video RAM (dual-ported DRAM), DRAM, or other forms of memory.

The computing system 100 also includes one or more displays 110, which are coupled with the video adapter and the window server 104. According to one embodiment of the invention, each of the display(s) 110 is associated with a color profile. Typically, a display may be associated with a default color profile. However, a different color profile may typically be chosen and associated with a display. It should be understood that different displays may support different color profiles. For example, a high resolution display may support a color profile associated with a relatively large amount of the total visible color space while a lower resolution display may not support such a color profile. In addition, the color profiles may be change depending on the state of displays. For example, if the display is connected to a computing system that does not have a permanent power supply, e.g., a laptop, palmtop, smartphone, etc., the color profile may dynamically change depending on whether the computing system is connected with the permanent power supply. In addition, in one embodiment of the invention, display color profiles are user selectable and user customizable. The device(s) 110 are associated with the display color profile(s) 150, as indicated by numeral 152.

At an operation 1, the window client 102 loads the image 120 into the backing store 130. In one embodiment of the invention, the image 120 is un-color corrected when loaded into the backing store 130. Thus, the backing store 130 stores the un-color corrected pixels of the image 120. In other words, unlike typical systems that perform color correcting, in some embodiments of the invention, un-color corrected pixels are stored in the backing store 130. Although FIG. 1 illustrates the window client 102 loading an un-color corrected image into the backing store 130, it should be understood that the window client 102 may load entire windows or portions windows, which will be described in greater detail later herein. At an operation 2, the window client 102 sends the image color profile 125 to the fragment program generator 135 of the window server 104. The fragment program generator 135 may optionally cache the image color profile 125 in the cache 138.

At an operation 3, the fragment program generator 135 gets display color profile(s) from the display(s) 110, and optionally caches those profile(s) in the cache 138. It should be understood that although a single display may be capable of supporting multiple display color profiles, typically a display has only one active display color profile. Thus, in one embodiment of the invention, the fragment program generator 135 requests the current (e.g. active) display profile from each of the display(s) 110.

At an operation 4, the texture mapping module 140 converts the stored image in the backing store 130 and converts it into one or more textures. For example, the texture mapping module 140 turns the un-color corrected image into one or more OpenGL textures. Sometime later, at an operation 5, the window server 104 loads the textures into the texture storage 170 of the video adapter 106.

At an operation 6, the fragment program generator 135 generates a fragment program based on the source and destination color profiles (e.g., based on the image color profile 125 and the display color profile 150) and sends the generated fragment program to the GPU 108. A fragment program is a character string that specifies a sequence of operations to perform and execute on a per-fragment basis (e.g., on a per-pixel basis). It should be understood that the fragment program is not based on the underlying pixels of the image and/or window. In other words, two completely different images may generate the same fragment program if those images are associated with the same color profiles (source and destination color profiles). As will be described later, the fragment program is used, during compositing, to perform color matching.

In one embodiment of the invention, the fragment program generator 135 caches generated fragment programs in the cache 138. For example, if a window client has two different source color profiles (e.g., a color profile associated with a first region of the window and a second different color profile associated with a second region of the window), and the display has a single destination color profile, the fragment program generator 135 may generate two fragment programs, one fragment program that specifies a sequence of operations to match the first source color profile with the destination color profile and a different fragment program that specifies a sequence of operations to match the second source color profile with the destination color profile. In one embodiment of the invention, generated fragment programs are each associated with a unique fragment program identifier, and are cached (e.g., in the cache 138). In addition, each image and/or window that share the same source profile and destination source profile share the same fragment program.

Figure 6:
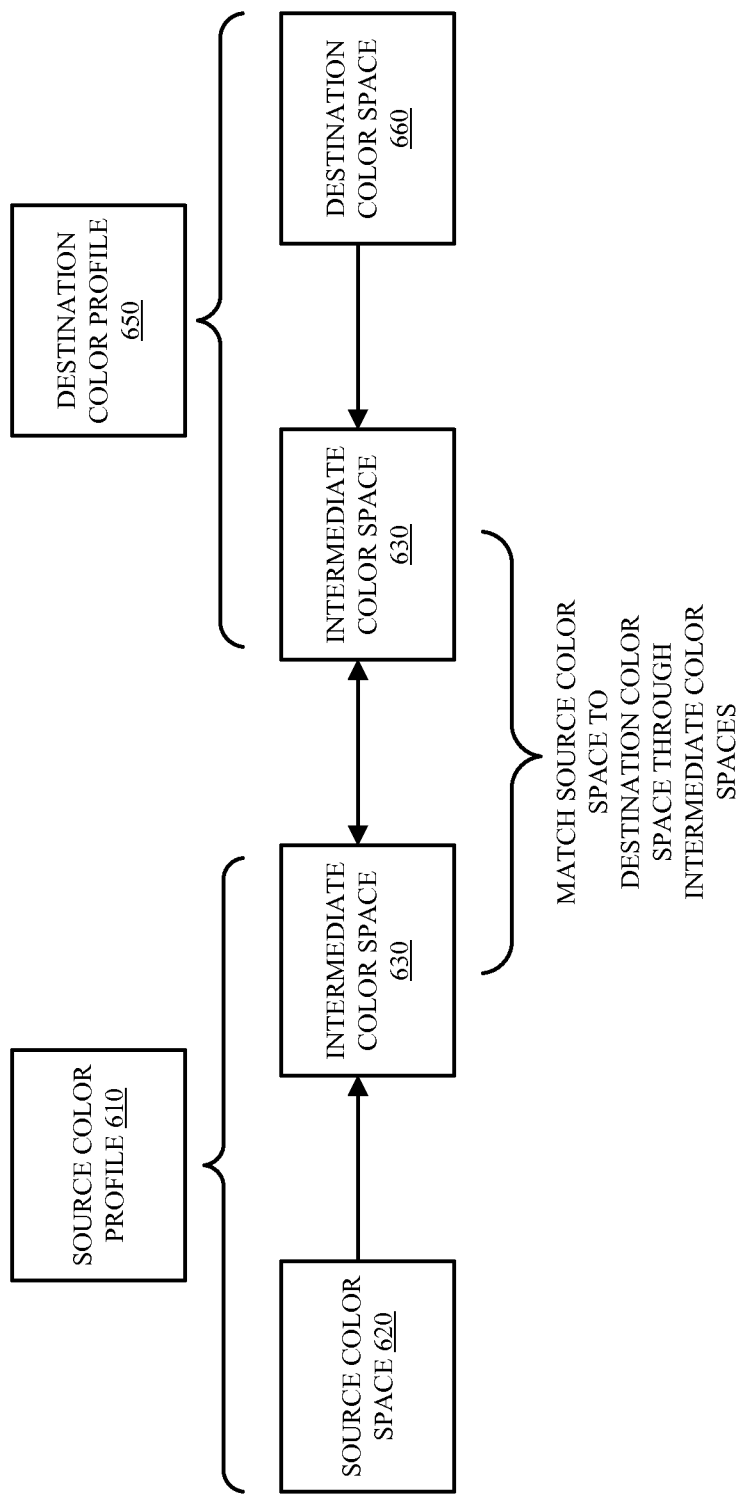
FIG. 6 is a block diagram illustrating an exemplary color matching process according to one embodiment of the invention.

FIG. 6 is a block diagram illustrating an exemplary color matching process according to one embodiment of the invention which exemplary illustrates the process the fragment program generator 125 performs when generating fragment programs. The source color profile 610 (e.g., the image color profile 125) includes the source color space 620 and the intermediate color space 630. The destination color profile 650 (e.g., one of the display color profile(s) 150) includes the intermediate color space 630 and the destination color space 660. The fragment program generator 135 matches the source color space 620 to the destination color space 660 through the common intermediate color space 630. The result is used to generate the sequence of operations (e.g., a fragment program), which when executed (e.g., by the GPU 108), color match the source color space with the destination color space. Although not illustrated in FIG. 6, one or more rendering intents may also be taken into consideration when matching the source color space 620 to the destination color space 660 (e.g., if colors of the source color space 620 do not overlap or are out of gamut with the colors of the destination color space 660).

At operation 7, the compositing and color matching module 160, executed by the GPU 108, retrieves the textures stored in the texture storage 170. In one embodiment of the invention, the compositing and color matching module 160 performs compositing on each pixel that is to be written to the display(s) 110. For example, the compositing and color matching module 160 blends the contents of each of the pixels of each image and/or window and generates a final image to be outputted to the display(s) 110. For example, if a user moves a window across a display, the compositing and color matching module 160 composites and re-composites the visible pixels of the window to reflect the movement of the window across the display in relation to any other windows and/or images on the display. In other words, the appearance of the display (the appearance of all the pixels on the display) is determined by the composite of all pixels written by all applications and their relative position to each other. Thus, the compositing and color matching module 160 is aware of the location of each pixel on the display(s) and is aware of which pixels are associated with each image and/or window.

In addition to performing compositing, in one embodiment of the invention, the compositing and color matching module 160 performs color correction (color matching) on the textures received in operation 7. In addition, in one embodiment of the invention, the compositing and color matching module 160 performs color correction during compositing. Thus, at operation 8, during compositing, the compositing and color matching module 160 performs color matching on the textures using the fragment program and writes the results to the frame buffer 180.

In one embodiment of the invention, the compositing and color matching module 160 performs color matching on only those pixels that will be written to the display. For example, if a window in the background of the display is overlapped by a window in the foreground, the pixels which will not be visible are not color corrected. Thus, unlike previous color management systems, only those pixels which are visible on the screen are color corrected. In addition, the data of the image or window stored in the backing store 130 and the data of the texture stored in the texture storage 170 remains the original un-color corrected data. Thus, if the user decides to change the profile of that image (e.g., to increase or decrease the amount of colors), the image and/or window does not need to be redrawn into the backing store 130 and/or the texture storage 170. Rather, only the association of the color profile with the image and/or window is changed. It should be understood that modifying the association conserves system resources (e.g. processing cycles, memory usage, etc.) as compared with redrawing the image.

In addition, unlike most color management systems in which the CPU performs color matching, in some embodiments of the invention the color matching is performed by a GPU in a graphics adapter. Thus, since the CPU does not perform color matching, the processing load on the CPU is reduced freeing the CPU to perform other tasks.

Referring back to FIG. 1, at operation 9, the result in the frame buffer 180 is written to the display(s) 110. Although not shown in FIG. 1 for simplicity purposes, it should be understood that additional hardware may exist between the frame buffer 180 and the display(s) 110. For example, a scan-out hardware may exist to write the information stored in the frame buffer 180 to the display(s) 100.

Figure 2:
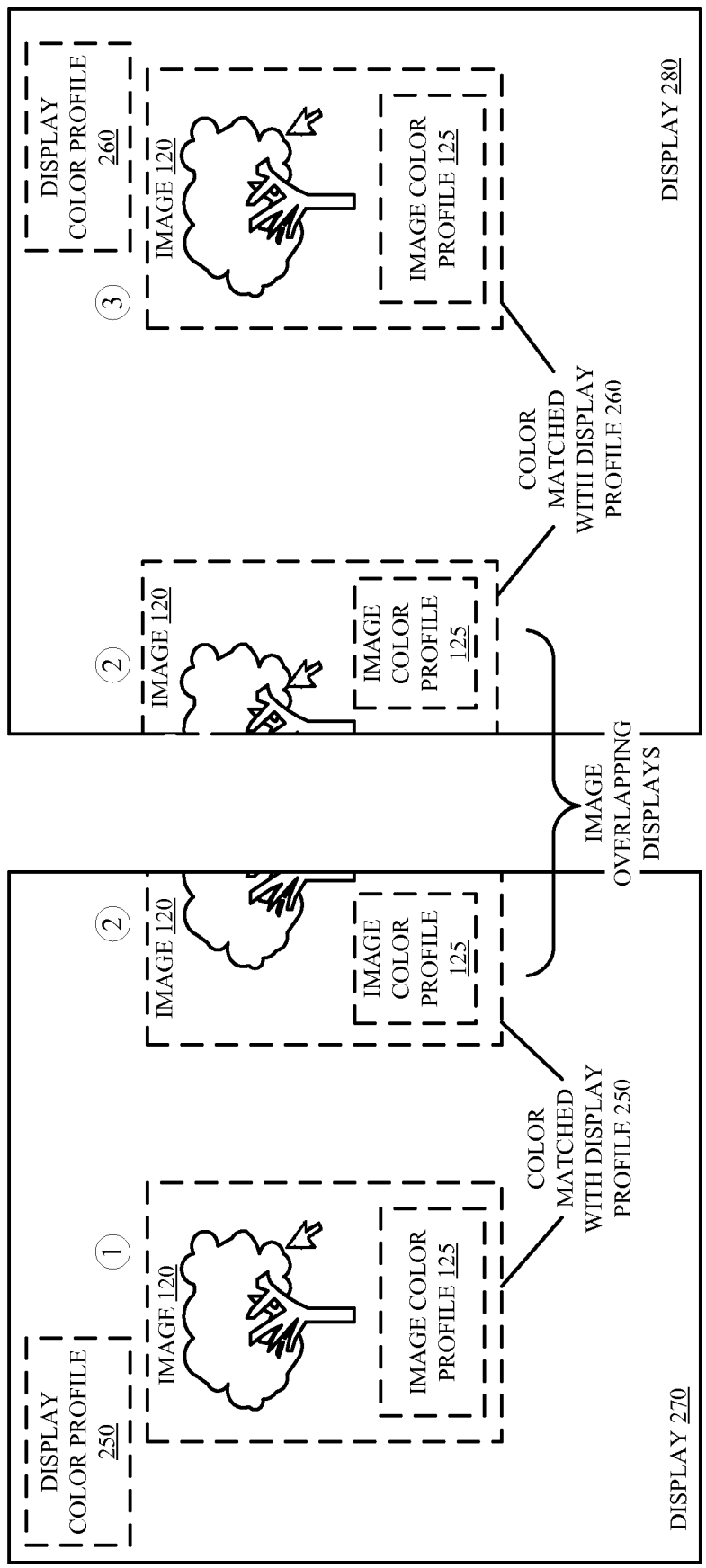
FIG. 2 illustrates color matching of an image that is overlapping two displays according to one embodiment of the invention.

FIG. 2 illustrates color matching of an image that is overlapping two displays according to one embodiment of the invention. Thus, for example, FIG. 2 illustrates the computing system 100 of FIG. 1 having a dual monitor setup (in other words, the computing system 100 is connected with two displays and may write to either of the display). With reference to FIG. 1, the display 270 and the display 280 are each coupled with the video adapter 106. FIG. 2 includes the display 270 and the display 280. It should be understood that the characteristics of the displays 270 and 280 may differ. For example, the display 270 may be a laptop display (with a relatively low amount of color space) while the display 280 may be a high-end display (with a relatively high amount of color space). The display 270 is associated with the display color profile 250 and the display 280 is associated with the display color profile 260.

As illustrated in FIG. 2, the image 120, associated with the image color profile 125, is moving from the display 270 to the display 280. For example, the user may select the image 120, originally displayed on the display 270 (e.g., with a mouse, keyboard, use of a touchscreen, etc.) and drag the image 120 to the display 280. This is represented in FIG. 2 at three time periods. The first time period, represented by a number 1 in FIG. 2, illustrates the image 120 being completely located and displayed on the display 270. The image 120 is color matched, during compositing, based on the image profile 125 and the display profile 250 with similar operations as described in FIG. 1.

The second time period, represented by a number 2 in FIG. 2, illustrates the image 120 partially located in the display 270 and partially located in the display 280 (in other words, the image 120 is overlapping the displays 270 and 280). Since color matching is performed by the compositing and color matching module 160 during compositing, and the compositing and color matching module 160 is aware of the location of the pixels of each image and/or window, the compositing and color matching module 160 is aware of which pixels of an image and/or window are in which display. In addition, since the compositing and color matching module 160 performs color matching during compositing, the compositing and color matching module 160 may color match each pixel depending on the location of that pixel regardless if pixels of the same window overlap displays (e.g., regardless of whether a pixel of the image 120 is located on the display 270 or is located on the display 280). Thus, the portion of the image 120 located on the display 270 is color matched with the device color profile 250 (associated with the display 270) with use of a first fragment program, and the portion of the image 120 located on the display 280 is color matched with the device color profile 260 (associated with the display 280) with use of a second fragment program. Thus, according to this embodiment of the invention, the color of the image 120 remains consistent between displays when the image is overlapping multiple displays, even if each of the displays has a different color profile.

The third time period, represented by a number 3 in FIG. 2, illustrates the image 120 being located entirely in the display 280. Thus, the image 120 has completely been moved from the display 270 to the display 280. The image 120 is color matched, during compositing, based on the image profile 125 and the display profile 260 with similar operations as described in FIG. 1.

It should be understood that typical color management systems do not perform color matching on portions of images overlapping multiple displays. For example, typical color management systems perform color matching prior to compositing (e.g., typical color management systems perform color matching prior to storing the image in a backing store). For example, with reference to FIG. 2, typical color management systems would perform color matching on the image 120 prior to the image 120 being written to the display 270 (based on the image color profile 125 and the display color profile 250) and a color-corrected image 120 would be stored in the backing store 130. However, these typical color management systems do not modify the color matching if the image overlaps multiple displays and/or if the image is completely moved to another display. Thus, these color management systems do not have knowledge of the location of the windows and/or the location of each pixel of the windows. Therefore, typical color management systems (as opposed to typical windowing systems) do not know if a window is overlapping multiple displays. Even if a typical color management system were to perform color matching upon an image being partially or entirely located in a different display (with a different profile) (e.g., on the image 120 at the time period 3 in FIG. 2), the CPU in the color management system would perform the mathematics of the color matching and write a new color-corrected image in the backing store 130. It should be understood that performing color matching in the CPU and writing over a previously color-corrected image is expensive (e.g., CPU cycles, system memory requirements, etc.).

In contrast, in some embodiments of the invention, since color matching is performed during compositing, individual pixels may be dynamically color matched depending on their location in a display at any particular point in time, without the CPU performing color matching and without re-writing the image in the backing store.

Figure 3:
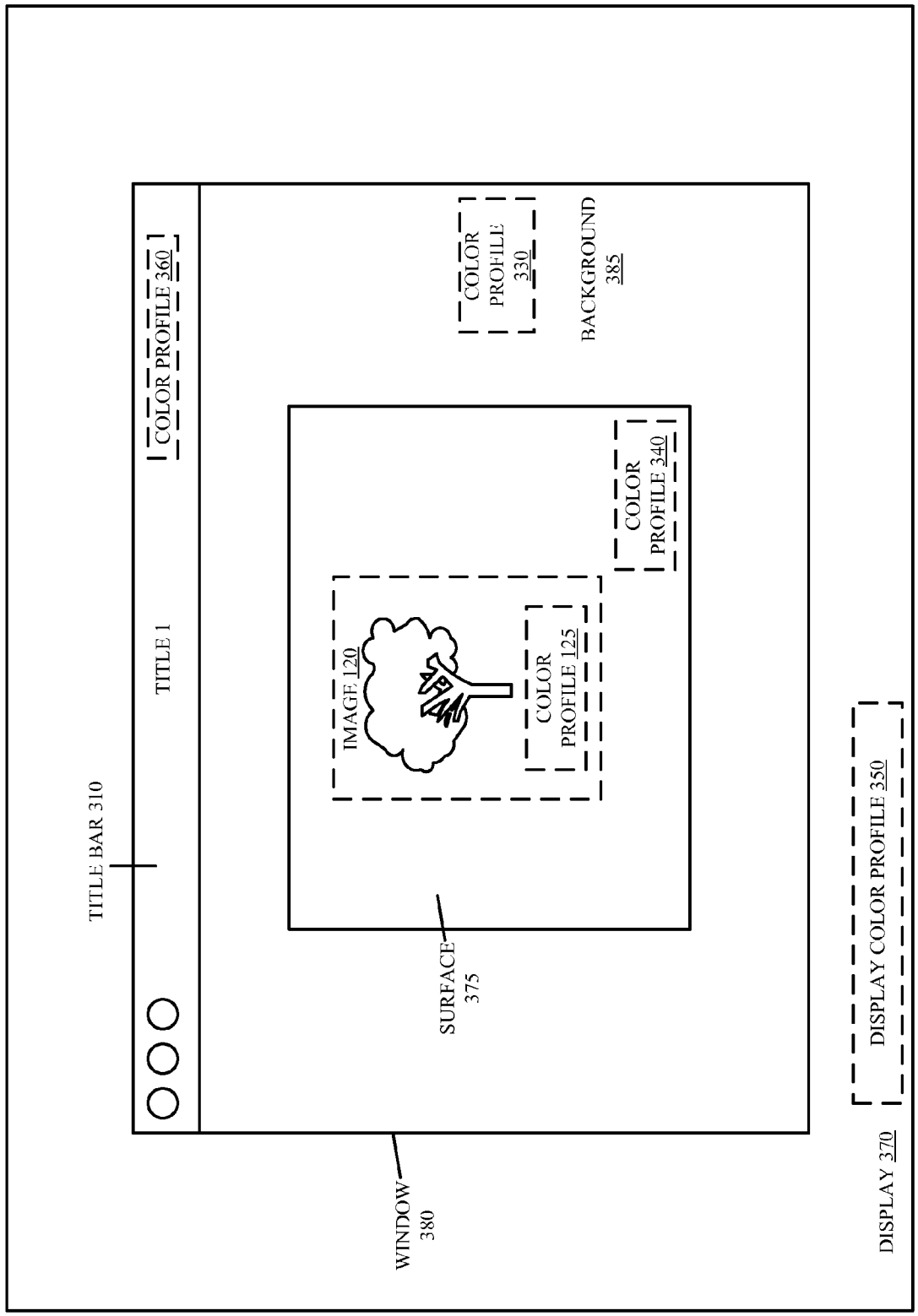
FIG. 3 illustrates different color profiles being associated with different regions in a display according to one embodiment of the invention.

In addition, in some embodiments of the invention different color profiles may be associated with different regions of a window. For example, FIG. 3 illustrates different color profiles being associated with different regions of the window 380 in the display 370 according to one embodiment of the invention. In FIG. 3, the display 370 is associated with the display color profile 325. The display 370 includes the window 380. According to one embodiment of the invention, the window 380 was created in response to a requesting window client. The window 380 includes multiple regions, each being associated with a color profile. For example, graphical user interface components of windows may be associated with different color profiles (e.g., title bars, toolbars, scroll bars, bottom bars, scope bars, icons, etc.). However, it should be understood that any region of the window, including non-graphical user interface components (e.g., working areas of a window) may be associated with a color profile. In FIG. 3, the title bar 310 is associated with the color profile 360, the background 385 is associated with the color profile 330, the surface 375 is associated with the color profile 340, and the image 120 is associated with the color profile 125. The color profiles 125, 330, 340, and 360 may each be different color profiles and/or some of the color profiles may be the same color profile and some of the color profiles may be different.

It should be understood that a fragment program may be generated for each distinct combination of window region color profile and display color profiles. For example, with reference to FIG. 3, if the color profiles 330, 340, and 360 are different color profiles (e.g. they each indicate a different color space or properties of a color space), a different fragment program is generated for the combination of each of the color profiles 330, 340, and 360 with the display color profile 350.

It should be understood that in addition to knowing the location of the window 380, the compositing and color matching module 160 knows the location of each pixel belonging to each region of the window 380. Thus, the compositing and color matching module 160 knows which pixels make up the title bar 310, which pixels make up the background 385, which pixels make up the surface 375, and which pixels make up the image 120. Thus, unlike typical color management systems which perform color matching prior to compositing (i.e., prior to storing the image in the backing store), in one embodiment of the invention the compositing and color matching module 160 may color match each region differently depending on the region's color profile and the color profile of the display. Additionally, in some embodiments of the invention one or more fragment programs are used to perform the color matching. Each region of the window 380 which is associated with the same profile may share the same fragment program.

In one embodiment of the invention, the color profile 360 (associated with the title bar 310) is a generic profile (e.g., a profile that has a relatively low amount of colors), while the color profile 340 (associated with the surface 375) is a wide-gamut profile (e.g., a profile that has a relatively high amount of colors). Although only a single window is illustrated in FIG. 3, in one embodiment of the invention, the computing system assigns each title bar of each window the same generic profile. In addition, the title bar 310 may include artwork (e.g., icon artwork, button artwork, etc.). Thus, instead of the applications assigning a color profile to the title bar and/or assigning a color profile to individual pieces of artwork on the title bar, the computing system may assign a generic profile to the title bar. Thus, title bars across multiple disparate applications may be associated with the same color profile and appear the same relative to their color (i.e., one application does not associate a color profile with a tile bar with a wider gamut color profile than another application). Of course, it should be understood that the computing system may assign color profiles to other regions of the window 380 other than the title bar 310. For example, the background 385 of each window may be assigned the same color profile according to one embodiment of the invention.

Figure 4:
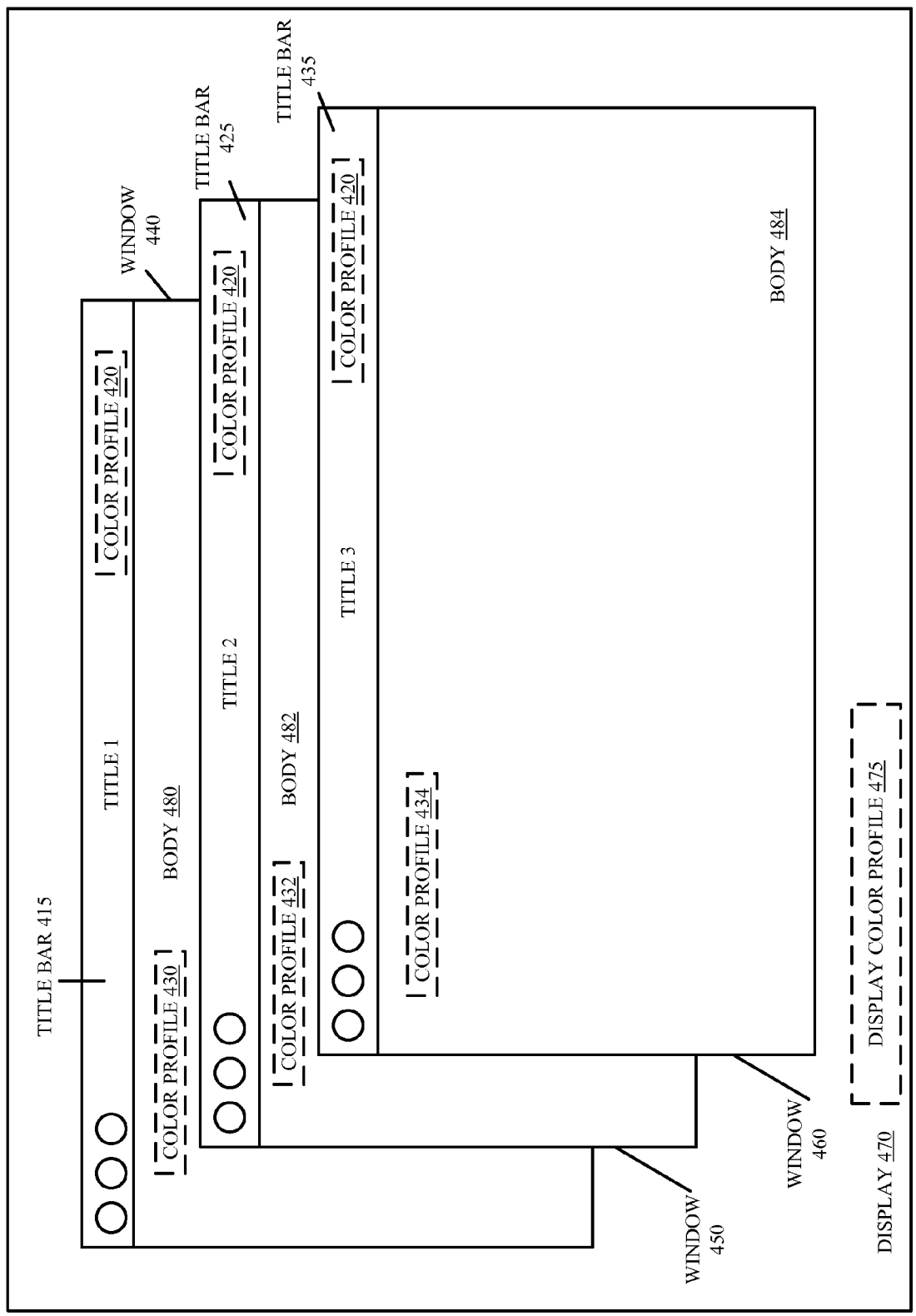
FIG. 4 illustrates the same color profile being associated to certain portions of multiple windows on a display according to one embodiment of the invention.

For example, FIG. 4 illustrates the same color profile being associated with the title bars 415, 425 and 435 of the windows 440, 450, and 460 respectively (the color profile 420 is associated with each of the title bars 415, 425, and 435 respectively). The window 460 is in the foreground, and covers a portion of the window 450. Additionally, the window 450 covers a portion of the window 440. Thus, the window 440 is in the background. According to one embodiment of the invention, the window 460 is the active window (i.e., the window that the user currently has focused on and/or is performing work within), while the windows 440 and 450 are inactive windows. The windows 440, 450, and 460 include the body portion 480, 482, and 484 respectively which are associated with the color profiles 430, 432, and 434 respectively. Additionally, the display 470 is associated with the display color profile 475.

According to one embodiment of the invention, certain portions of inactive windows are automatically assigned a generic color profile (e.g. a color profile with a relatively low amount of colors (a narrow gamut), for example a generic RBG or generic CMYK color profile). For example, regardless of the color profile originally associated with a portion of the window (e.g., the body of the window), upon becoming an inactive window, that color profile is automatically changed to a generic color profile (if the body is not already a generic color profile). Thus, upon becoming an inactive window (which usually, but not necessarily, includes a different window becoming an active window) a generic color profile is associated with the inactive window and the compositing and color module 160 color matches the generic color profile with the display color profile 475. In this fashion, inactive windows do not have a color profile with a wider gamut than active windows.

Figure 5:
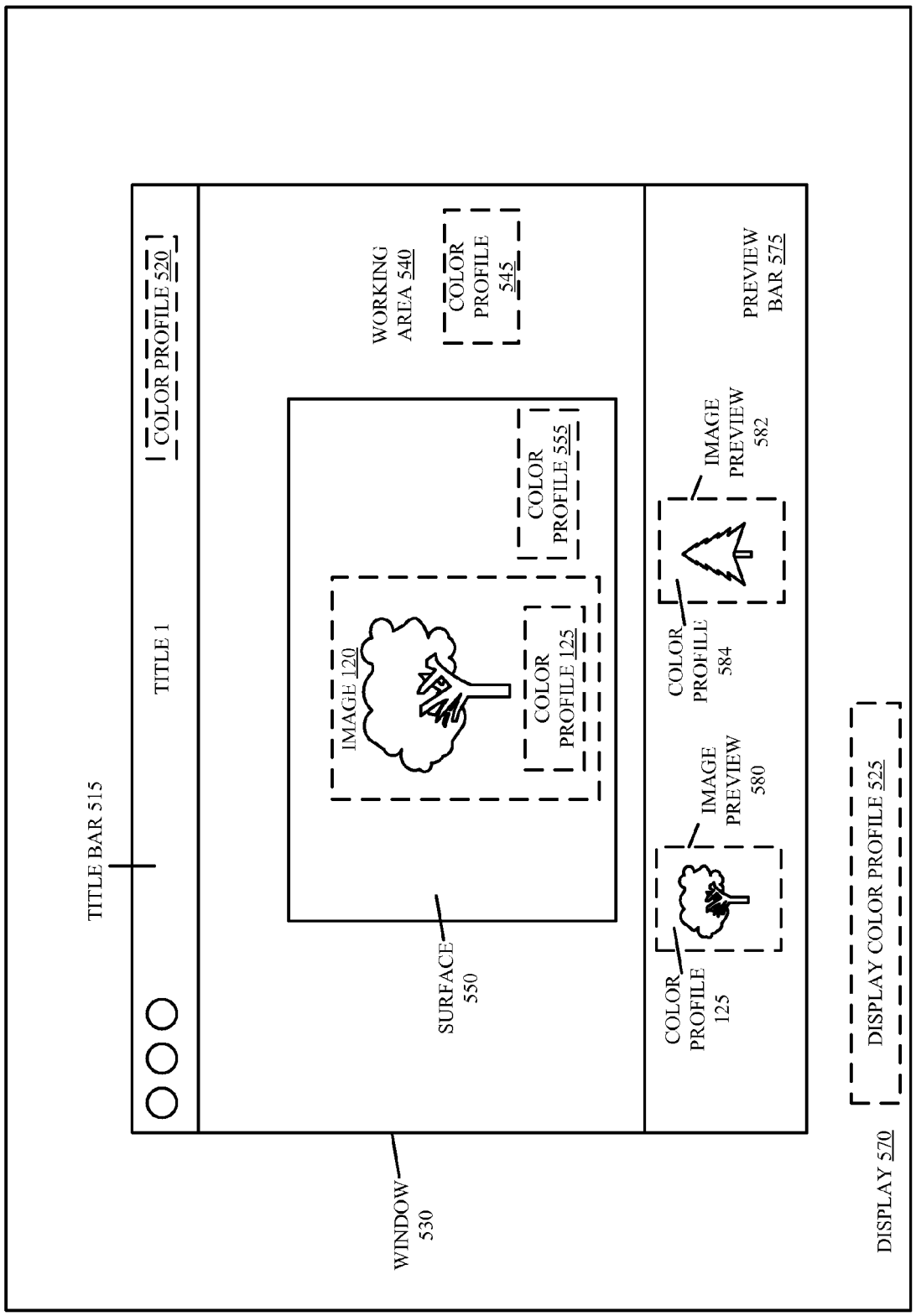
FIG. 5 illustrates an example of an image and an image preview being associated with the same color profile according to one embodiment of the invention.

FIG. 5 illustrates an example of an image and an image preview being associated with the same color profile according to one embodiment of the invention. The display 570, associated with the display color profile 525, includes the window 530. The window 530 includes various regions, including the title bar 515, the working area 540, the surface 550, and the preview bar 575. According to one embodiment of the invention, the preview bar 575 includes smaller representations of images (e.g., thumbnails) available for use in the working area 540. The title bar 515 is associated with the color profile 520. The working area 540 is associated with the color profile 545. The surface 550 is associated with the color profile 535, and the image 120 is associated with the color profile 125.

The preview bar 575 includes the image preview 580 and the image preview 582. The image preview 582 is associated with the color profile 584. The image preview 580 is a preview of the image 120. Since the image preview 580 is a preview of the image 120, according to one embodiment of the invention, the image preview 580 is associated with the same color profile as the image 120. Thus, the image preview 580 is associated with the color profile 125. Thus, the image 120 and the image preview 580 are color matched with the same color profile, and thus will look similar with regards to the color. Similarly, if the image preview 582 is selected, the image displayed in the working area 540 will have the same color profile as the image preview 582. Thus, images displayed in the working area look the same, relative to their color, as preview images located in the preview bar, according to one embodiment of the invention.

Figure 7:
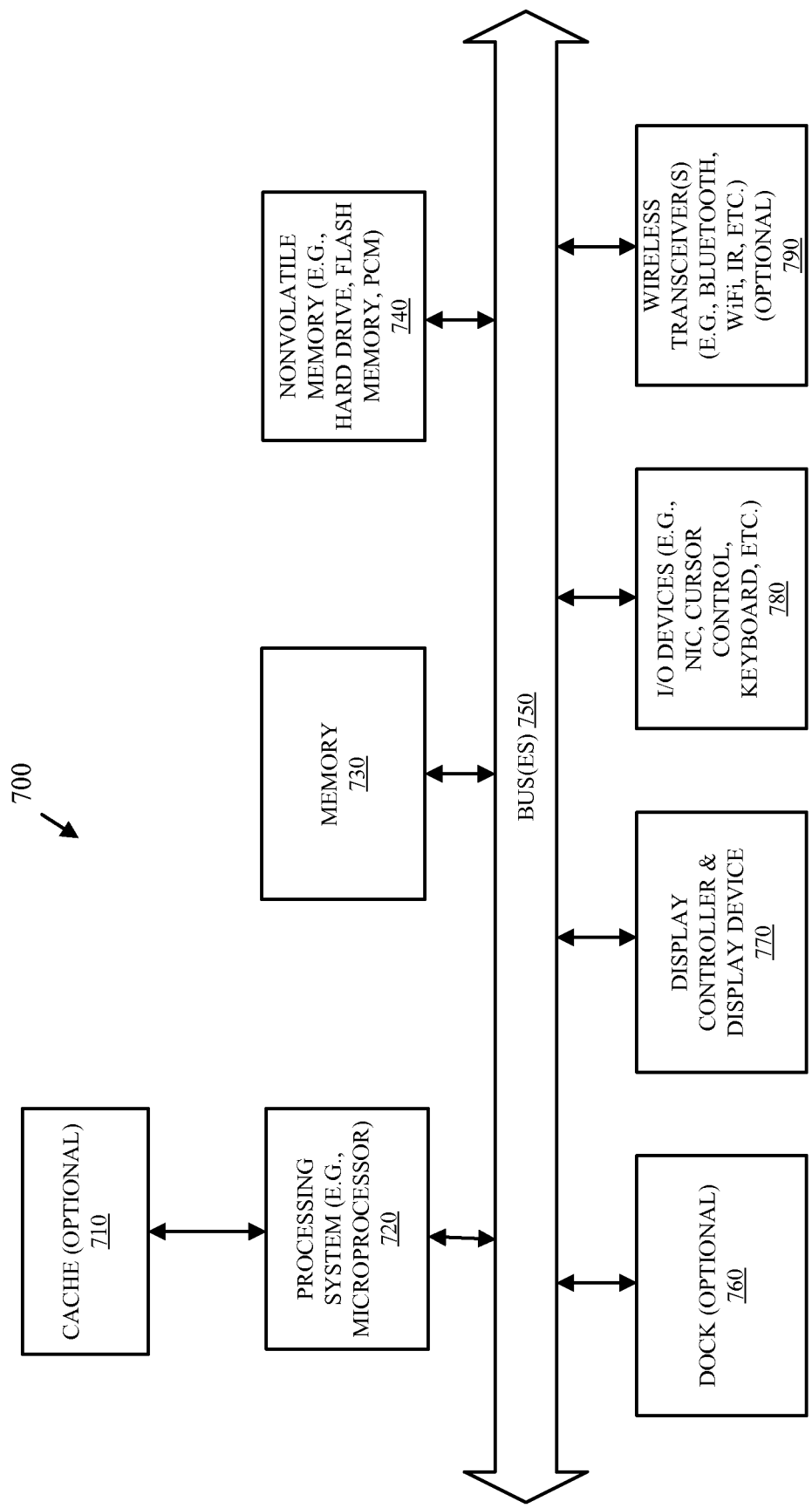
FIG. 7 is a block diagram of an exemplary computer system which may be used in some embodiments of the invention.

FIG. 7 is a block diagram illustrating an exemplary computing system which may be used in some embodiments of the invention. Note that while FIG. 7 illustrates various components of a computer system, it is not intended to represent any particular architecture or manner of interconnecting the components as such details are not germane to the present inventions. It will also be appreciated that personal digital assistants (PDAs), cellular telephones, media players (e.g. an iPod), devices which combine aspects or functions of these devices (a media player combined with a PDA and a cellular telephone in one device), network computers, an embedded processing device within another device, and other data processing systems which have fewer components or perhaps more components may also be used to implement one or more embodiments of the present inventions and may be one or more of the data processing systems described herein. The computer system shown in FIG. 7 may, for example, be a Macintosh computer from Apple Computer, Inc. or a computer which runs the Windows operating software from Microsoft Corporation.

As shown in FIG. 7, the computer system 700 includes the bus(es) 750 which are coupled to one or more microprocessors which form a processing system 720. The bus(es) 750 are also coupled to memory 730 and to a non volatile memory 740, which may be a magnetic hard drive in certain embodiments, or flash memory in other embodiments. The bus(es) 750 are also coupled to a display controller and display 770 and one or more input/output (I/O) devices 780. Further, the bus is coupled to an optional dock 760 and to one or more wireless transceivers 790, which may be a Bluetooth transceiver or a WiFi transceiver or an infrared transceiver. It will be appreciated that the wireless transceivers 790 are optional as shown in FIG. 7. The processing system 720 may optionally be coupled to optional cache 710. The processing system 720 may include one or more microprocessors, such as a microprocessor from Intel or IBM. The bus(es) 750 interconnects these various components together in a manner which is known in the art. Typically, the input/output devices 780 are coupled to the system through input/output controllers. The memory 730 may be implemented as dynamic RAM (DRAM) which provides fast access to data but requires power continually in order to refresh or maintain the data in the memory. The non volatile memory 740 may be a magnetic hard drive or other non volatile memory which retains data even after power is removed from the system. While FIG. 7 shows that the non volatile memory 740 is a local device coupled directly to the rest of the components in the data processing system, it will be appreciated that other embodiments may utilize a non volatile memory which is remote from a system, such as a network storage device, which is coupled to the data processing system through a network interface, such as a modem or an Ethernet interface. The bus(es) 750, as is well known in the art, may include one or more buses connected to each other through various bridges, controllers, and/or adapters as is known in the art. In one embodiment, the I/O controller 780 may include a USB adapter for controlling USB peripherals and an IEEE 1394 controller for IEEE 1394 compliant peripherals.

It will be apparent from this description that aspects of the inventions may be embodied, at least in part, in software. That is, the techniques may be carried out in a computer system or other data processing system in response to its processor or processing system executing sequences of instructions contained in a memory, such as memory 730 or non volatile memory 740. In various embodiments, hardwired circuitry may be used in combination with the software instructions to implement the present inventions. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize that what is meant by such expressions is that the functions result from execution of the code by a processing system. The dock 760 and/or the wireless transceivers 790 provide a physical interface for coupling the data processing system shown in FIG. 7 to another data processing system, e.g. to another data processing system which resembles the system shown in FIG. 7.

While embodiments have been discussed with the image and/or window being associated with a color profile, it should be understood that if an image and/or a window and/or a region of window is not associated with a color profile, according to one embodiment of the invention the computing system 100 assumes a generic color profile and associates a generic color profile with that image and/or window and/or region of the window.

While embodiments of the invention have described color matching performed by a graphics processing unit in a video adapter, in alternative embodiments of the invention color matching is performed, during compositing, by a system CPU.

While the flow in the data flow diagram in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer implemented method for color matching during compositing, comprising:

storing a set of one or more un-color matched pixels of at least one image, wherein the set of un-color matched pixels of the at least one image is associated with an image color profile, wherein the set of un-color matched pixels collectively form a first region and a second region to be positioned on a display, wherein the first region is associated with the image color profile, and the second region is associated with a color profile different than the image color profile;

generating a first fragment program based on the image color profile and a display color profile, wherein the display color profile is associated with the display;

applying the first generated fragment program to the set of un-color matched pixels of the first region to match colors of those pixels with the display during compositing of color matched pixels with a graphics processing unit; and writing the color matched pixels to the display.

2. The computer implemented method of claim 1, wherein the set of un-color matched pixels are stored in a backing store of a window server, and further comprising converting the set of un-color matched pixels into one or more textures prior to applying the first generated fragment program.

3. The computer implemented method of claim 1, wherein the first generated fragment program is a character string specifying a sequence of operations, which when executed, color match the set of un-color matched pixels with the display.

4. The computer implemented method of claim 1, wherein the graphics processing unit executes program code to composite the set of un-color matched pixels of the second region and apply a second generated fragment program to those pixels.

5. The computer implemented method of claim 1, further comprising storing generated fragment programs in a cache memory.

6. A computer implemented method for color matching during compositing, comprising:
    storing a set of one or more un-color matched pixels of at least one image, wherein the set of un-color matched pixels of the at least one image is associated with a first image color profile;
    generating a first fragment program based on the first image color profile and a first display color profile, wherein the first display color profile is associated with a first display;
    applying the first generated fragment program to the set of un-color matched pixels to match colors of those pixels with the first display during compositing of color matched pixels with a graphics processing unit; and
    writing the color matched pixels to the first display, wherein instructions indicate that a first portion of the set of un-color matched pixels is to be positioned in an area of the first display and a second portion of the set of un-color matched pixels is to be positioned in an area of a second display, wherein the second display is associated with a second display color profile;
    generating a second fragment program based on the first image color profile and the second display color profile;
    during compositing of the first portion of the set of un-color matched pixels, applying the first generated fragment program to the set of un-color matched pixels to match colors of those pixels with the first display;
    during compositing of the second portion of the set of un-color matched pixels, applying the second generated fragment program to the set of un-color matched pixels to match colors of those pixels with the second display; and
    writing the color matched pixels of the first portion to the first display and the color matched pixels of the second portion to the second display.

7. A computer implemented method for color matching during compositing, comprising:
    storing a set of one or more un-color matched pixels of at least one image, wherein the set of un-color matched pixels of the at least one image is associated with a first image color profile;
    generating a first fragment program based on the first image color profile and a first display color profile, wherein the first display color profile is associated with a first display;
    applying the first generated fragment program to the set of un-color matched pixels to match colors of those pixels with the first display during compositing of color matched pixels with a graphics processing unit; and
    writing the color matched pixels to the first display, wherein instructions indicate that a first portion of the set of un-color matched pixels is to be positioned in an area of the first display and a second portion of the set of un-color matched pixels is to be positioned in an area of a second display, wherein the second display is associated with a second display color profile, wherein the set of un-color matched pixels collectively form a window, the window including a first and second region, wherein the first region is associated with the first image color profile, and the second region is associated with a third color profile different than the first image color profile, and further comprising
    generating a second fragment program based on the third color profile and the first display color profile;
    during compositing of those un-color matched pixels of the first region, applying the first generated fragment program to those pixels to match colors of those pixels with the first display;
    during compositing of those un-color matched pixels of the second region, applying the second generated fragment program to those pixels to match colors of those pixels with the first display; and
    writing the color matched pixels of the first and second region to the first display.

8. The computer implemented method of claim 7, wherein the second region includes graphical user interface components of the window, and wherein the second region is automatically associated with the third color profile, and wherein the first display color profile indicates a generic color space.

9. The computer implemented method of claim 8, wherein the graphical user interface components include one or more of a toolbar, a scrollbar, a bottom bar, scope bar, or an icon.

10. A computing system to perform color matching during compositing, comprising:
    a window client to load a set of one or more un-color matched pixels in a backing store of a window server, wherein the set of un-color matched pixels of the at least one image is associated with an image color profile, wherein the set of un-color matched pixels collectively form a first region and a second region to be positioned on a display, wherein the first region is associated with the image color profile, and the second region is associated with a color profile different than the image color profile;
    a window server coupled with the window client, the window server including a fragment program generator to generate a first fragment program based on the image color profile and a display color profile and to transmit the first fragment program to a video adapter, wherein the display color profile is associated with the display;
    the video adapter coupled with the window server, the video adapter including a graphics processing unit to execute the first generated fragment program during compositing to color match the set of un-color matched pixels of the first region with the display; and the display coupled with the video adapter, the display to display the color matched pixels.

11. The computing system of claim 10, wherein the backing store is stored in system memory of the computing system, and wherein the color profiles are stored in the system memory of the computing system.

12. The computing system of claim 10, wherein the first generated fragment program is a character string specifying a sequence of operations.

13. The computing system of claim 10, further comprising the fragment program generator to store generated fragment programs in a cache memory.

14. The computing system of claim 10, wherein the set of un-color matched pixels collectively form a window.

15. The computing system of claim 14, wherein the second region includes graphical user interface components of the window.

16. The computing system of claim 15, wherein the graphical user interface components include one or more of a toolbar, a scrollbar, a bottom bar, scope bar, or an icon.

17. A computing system to perform color matching during compositing, comprising:

a window client to load a set of one or more un-color matched pixels in a backing store of a window server, wherein the set of un-color matched pixels of the at least one image is associated with a first image color profile;

a window server coupled with the window client, the window server including a fragment program generator to generate a first fragment program based on the image color profile and a first display color profile and to transmit the first fragment program to a video adapter, wherein the display color profile is associated with a first display;

the video adapter coupled with the window server, the video adapter including a graphics processing unit to execute the first generated fragment program during compositing to color match the set of un-color matched pixels with the first display; and the first display coupled with the video adapter, the first display to display the color matched pixels, wherein the window client to generate instructions indicating that a first portion of the set of un-color matched pixels is to be positioned in an area of the first display and a second portion of the set of un-color matched pixels is to be positioned in an area of a second display, wherein the second display is associated with a second display color profile;

the window server further to receive those instructions and generate a second fragment program based on the first image color profile and the second display color profile, and to transmit the second fragment program to the video adapter;

during compositing, the graphics processing unit to execute the first and second generated fragment programs to color match the first and second portion of the set of un-color matched pixels with the first and second display respectively;

the first display to display the color matched pixels of the first portion; and the second display coupled with the video adapter, the second display to display the color matched pixels of the second portion.

18. A machine-readable storage medium that provides instructions that, if executed by a processor, will cause said processor to perform operations for color matching during compositing, comprising:

storing a set of one or more un-color matched pixels of at least one image, wherein the set of un-color matched pixels of the at least one image is associated with a first image color profile, wherein the set of un-color matched pixels collectively form a first region and a second region to be positioned on a first display, wherein the first region is associated with the image color profile, and the second region is associated with a color profile different than the image color profile;

generating a first fragment program based on the first image color profile and a first display color profile, wherein the first display color profile is associated with a first display;

applying the first generated fragment program to the set of un-color matched pixels to match colors of those pixels with the first display during compositing of color matched pixels; and writing the color matched pixels to the first display.

19. The machine-readable storage medium of claim 18, wherein the set of un-color matched pixels are stored in a backing store of a window server, and further comprising converting the set of un-color matched pixels into one or more textures prior to applying the first generated fragment program.

20. The machine-readable storage medium of claim 18, wherein the first generated fragment program is a character string specifying a sequence of operations, which when executed, color match the set of un-color matched pixels with the first display.

21. The machine-readable storage medium of claim 18, wherein a graphics processing unit executes program code to composite the set of un-color matched pixels and apply the first generated fragment program to those pixels.

22. The machine-readable storage medium of claim 18, further comprising storing generated fragment programs in a cache memory.

23. The machine-readable storage medium of claim 18, wherein instructions indicate that a first portion of the set of un-color matched pixels is to be positioned in an area of the first display and a second portion of the set of un-color matched pixels is to be positioned in an area of a second display, wherein the second display is associated with a second display color profile, the method further comprising generating a second fragment program based on the first image color profile and the second display color profile;

during compositing of the first portion of the set of un-color matched pixels, applying the first generated fragment program to the set of un-color matched pixels to match colors of those pixels with the first display;

during compositing of the second portion of the set of un-color matched pixels, applying the second generated fragment program to the set of un-color matched pixels to match colors of those pixels with the second display; and writing the color matched pixels of the first portion to the first display and the color matched pixels of the second portion to the second display.

24. The machine-readable storage medium of claim 18, wherein the set of un-color matched pixels collectively form a window, the window including a third and fourth region, wherein the third region is associated with a second image color profile, and the fourth region is associated with a third color profile different than the second image color profile, and further comprising
- generating a second fragment program based on the third color profile and the first display color profile;
- during compositing of those un-color matched pixels of the third region, applying the first generated fragment program to those pixels to match colors of those pixels with the first display;
- during compositing of those un-color matched pixels of the fourth region, applying the second generated fragment program to those pixels to match colors of those pixels with the first display; and
- writing the color matched pixels of the third and fourth region to the first display.

25. The machine-readable storage medium of claim 24, wherein the fourth region includes graphical user interface components of the window, and wherein the fourth region is automatically associated with the third color profile, and wherein the first display color profile indicates a generic color space.

26. The machine-readable storage medium of claim 25, wherein the graphical user interface components include one or more of a toolbar, a scrollbar, a bottom bar, scope bar, or an icon.

* * * * *